US012513785B2

(12) United States Patent
Kachelhoffer

(10) Patent No.: US 12,513,785 B2
(45) Date of Patent: Dec. 30, 2025

(54) ELECTRIC HEATING DEVICE AND METHOD FOR MANUFACTURING THE SAME

(71) Applicant: Eberspächer catem GmbH & Co. KG, Herxheim (DE)

(72) Inventor: Patrick Kachelhoffer, Seebach (FR)

(73) Assignee: Eberspächer catem GmbH & Co. KG, Herxheim (DE)

(*) Notice: Subject to any disclaimer, the term of this patent is extended or adjusted under 35 U.S.C. 154(b) by 912 days.

(21) Appl. No.: 17/726,094

(22) Filed: Apr. 21, 2022

(65) Prior Publication Data

US 2022/0346195 A1 Oct. 27, 2022

(30) Foreign Application Priority Data

Apr. 26, 2021 (DE) ..................... 10 2021 110 624.9

(51) Int. Cl.
*H05B 3/50* (2006.01)
*H05B 3/06* (2006.01)

(52) U.S. Cl.
CPC ................. *H05B 3/50* (2013.01); *H05B 3/06* (2013.01); *H05B 2203/02* (2013.01)

(58) Field of Classification Search
CPC ......... H05B 3/50; H05B 3/06; H05B 2203/02
See application file for complete search history.

(56) References Cited

U.S. PATENT DOCUMENTS

2012/0061366 A1* 3/2012 Kohl ........................ H05B 3/50 219/202
2020/0340708 A1* 10/2020 Walz ..................... F24H 9/1827
2021/0033303 A1* 2/2021 Kachelhoffer ........ F24H 3/0476
2021/0045196 A1* 2/2021 Niederer .................. H05B 3/24
2022/0297506 A1 9/2022 Kachelhoffer
2022/0394820 A1* 12/2022 Huis .................... H05B 1/0236

FOREIGN PATENT DOCUMENTS

| | | |
|---|---|---|
| DE | 28 16 076 A1 | 10/1979 |
| DE | 20121116 | 4/2003 |
| EP | 0 899 985 A1 | 3/1999 |
| EP | 1 872 986 A1 | 1/2008 |
| EP | 2 337 425 A1 | 6/2011 |
| EP | 2 637 474 A1 | 9/2013 |
| EP | 2 440 004 B1 | 2/2015 |
| EP | 3 290 819 A1 | 3/2018 |
| EP | 3 228 950 B1 | 6/2019 |

* cited by examiner

*Primary Examiner* — Elizabeth M Kerr
*Assistant Examiner* — Keith Brian Assante
(74) *Attorney, Agent, or Firm* — Boyle Fredrickson, S.C.

(57) ABSTRACT

An electric heating device includes a housing which forms a receiving pocket in which at least one PTC heating assembly with at least one PTC element received in a positioning frame and strip conductors electrically conductively connected to the PTC element for energizing the PTC element with different polarity is received. In order to compensate for manufacturing tolerances without significantly impairing the heat dissipation from the PTC element, at least one profile part is connected opposite main side surfaces of the PTC element in a heat-conducting manner. Outer main side surfaces of the profile parts opposite the PTC element are connected to an inner surface of the receiving pocket in a heat-conducting manner in each case. The profile parts are connected to the positioning frame.

12 Claims, 5 Drawing Sheets

ELECTRIC HEATING DEVICE AND METHOD FOR MANUFACTURING THE SAME

BACKGROUND OF THE INVENTION

1. Field of the Invention

The present invention relates to an electric heating device having a housing forming a receiving pocket in which at least one PTC heating assembly is received. The PTC heating assembly has a positioning frame in which at least one PTC element is received. Furthermore, strip conductors electrically connected to the PTC element are provided, as well as a heater housing.

2. Background of the Invention

In the aforementioned prior art, the positioning frame serves for retaining the PTC element and for arranging the strip conductors. EP 2 637 474 A1 or EP 2 337 425 A1 respectively disclose PTC elements which are inserted into a corresponding receiving pocket. The electric heating devices provided for this purpose have a housing with a partition wall which separates a connection chamber from a heating chamber for the emission of heat and from which at least one heating rib projects in the direction of the heating chamber, which forms the receiving pocket in which the PTC heating assembly is received.

Such a configuration can also be used in the present invention. In this context, EP 2 637 474 A1 representing the preamble discloses a PTC heating assembly, which joins a wedge element in a structural unit, which is provided on a main side surface of the at least one PTC element. After inserting the PTC heating assembly into the receiving pocket, the wedge element is displaced in order to connect the PTC element to the inner surfaces of the receiving pocket in a good heat-conducting manner.

In the previously described solutions, the receiving pocket tapers towards its lower closed end. Accordingly, the insertion opening that opens to the connection chamber is wider than the lower closed end of the receiving pocket. The PTC elements and the contact sheets abutting them on both sides are usually clamped with interposition of at least one insulating layer between the strip conductors and opposite inner surfaces of the receiving pocket with a wedge-shaped pressure element in the same. This wedge element ensures that the layers of the layer structure are applied against each other in a clamped manner. These layers are at least the PTC element(s) and the strip conductors, usually contact sheets, extending at right angles to the direction of force action of the wedge element, as well as at least one insulating layer.

Despite the downwardly tapering cross-sectional shape of the receiving pocket due to the manufacturing process, the wedge element is intended to enable good heat transfer between the two opposing heat extraction surfaces of the PTC element and the respective inner surfaces of the receiving pocket with interposition of the wedge element. Due to the pressure built up there, the opposite heat extraction surface of the PTC element is also applied directly or with the interposition of an insulating layer against the opposite inner surface of the receiving pocket.

Thus, good heat extraction is ensured. However, there is the problem that the receiving pocket does not always correspond to the specified shape due to manufacturing tolerances.

Furthermore, the PTC elements are subject to certain dimensional fluctuations due to the manufacturing process. It is also not always ensured that the heat extraction surfaces of the PTC element are running perfectly straight and flat.

Press-fitting a wedge as a pressure element can lead to stress peaks which can cause the PTC element or a ceramic insulating layer within the receiving pocket to break. Depending on the tolerances, the wedge element used as a pressure element in the prior art may not be thick enough in the specific application so that it basically sits ineffectively on the lower end of the receiving pocket. If, by contrast, the free space remaining before the wedge element is inserted is too small, there is insufficient coverage of the heat extraction surface of the PTC element in the height direction of the receiving pocket, i.e. between the lower end and the insertion opening. As a result, the PTC element heats up too intensely and prevents further absorption of power current. Consequently, the efficiency of the PTC element is poor.

SUMMARY

The present invention aims to provide an electric heating device of the type described above which can compensate for manufacturing tolerances in an improved manner without significantly impairing the heat dissipation from the PTC element and which can be manufactured economically.

In order to solve this problem, the present invention proposes an electric heating device including a housing forming a receiving pocket, a positioning frame that is disposed in the receiving pocket, and a PTC element and strip conductors that are received in the positioning frame. The strip conductors are electrically conductively connected to the PTC element for energizing the PTC element with different polarity. At at least one profile part is connected in a heat-conducting manner to the PTC element on opposite main side surfaces of the PTC element. Outer main side surfaces of the profile parts opposite the PTC element are connected in a heat-conducting manner to an inner surface of the receiving pocket in each case. The profile parts are connected to the positioning frame.

The electric heating device may be configured for use as an electric heating device for a motor vehicle. The housing is usually a housing suitable for heating a fluid medium, which has inlet and outlet nozzles for this purpose, but otherwise seals off the heating chamber. A partition wall may separate a connection chamber from a heating chamber in a fluid-tight manner. The partition wall is protruded by an upper end of the PTC heating assembly. Usually, several PTC heating assemblies are provided which project into the heating chamber as heating ribs. The end of the PTC heating assembly projecting into the connection chamber usually comprises contact tongues which are electrically contacted in the connection chamber, for which purpose a contacting device may be provided which combines the different PTC heating assemblies by grouping the contact tongues into heating circuits and is provided with contact tongues which project into an equipped printed circuit board in the alignment of the contact tongues of the PTC heating assemblies. This equipped printed circuit board controls the power current for heating the PTC heating assembly and usually forms a control device; cf. EP 2 440 004 A1 and EP 1 872 986 A1, respectively.

However, the housing can also be formed by an extruded profile which forms a receiving pocket open on both sides, wherein the inner surface of the receiving pocket is shaped by a partition wall which forms a heating chamber extending parallel to the receiving pocket, which guides the fluid to be heated. Several profiles can be arranged next to each other in this way so that a parallel flow for the fluid to be heated is guided past various receiving pockets, as is known in principle from EP 0 899 985 A1, for example. The receiving pocket can be formed between two joined profiles. However, the receiving pocket can also be formed within a uniform extruded profile.

According to an aspect of the present invention, in the receiving pocket and between the PTC heating assembly, a profile part is provided on an inner side of the receiving pocket in each case. This profile part serves to compensate for stress peaks during heat-conducting tensioning of the PTC element in the receiving pocket, for which purpose configurations of the profile parts still explained in more detail below may be provided.

The profile parts may in any case connected to the positioning frame. The positioning frame thereby joins at least the PTC element, which is received in a receptacle formed by the positioning frame in a manner known per se. The positioning frame also positions strip conductors, usually in the form of contact sheets, which project beyond the positioning frame on one side to form contact tongues. The strip conductors can be connected to the positioning frame by a material or form-fit connection.

Insulating layers, typically in the form of ceramic plates, are usually provided on the outside of the strip conductors so that a heating cell comprising the PTC element and the two contact surfaces is received between the two insulating layers in an electrically insulating manner. The profile parts are usually located on the outside of the insulating layers. The profile parts e are connected to the positioning frame. The connection of the profile parts to the positioning frame usually also results in positioning of the insulating layers. One of the insulating layers can, for example, be held in a force-fitting manner, e.g. clamped, between the profile part and the associated strip conductor. Alternatively, fastening segments of the positioning frame interacting with the profile parts can also hold the strip conductors and/or the insulating layers in position. Connecting the profile parts to the positioning frames provides a PTC heating assembly which can be handled as a structural unit and, after pre-assembly, can be inserted as such in the receiving pocket.

The profile parts can be clipped to the positioning frame. For this purpose, the positioning frame usually has an engaging pawl that engages behind the respective profile part. The positioning frame may have an upper cross beam surmounted on one side by the contact tongues and a lower cross beam provided opposite it. According to this possible further development, form-fit segments project from each of the cross beams and overlap the associated profile parts. At least the form-fit segments associated with a cross beam are usually configured as engaging pawls, so that the profile parts can be connected to the positioning frame by clipping and thus in a simple manner.

It is understood that the positioning frame is usually made of an electrically non-conductive material, for example plastic, typically an injection molded plastic. The profile parts are usually extruded profiles and made of metal, typically aluminum. Each of the profile parts may be connected in the receiving pocket by a tongue and groove joint. The tongue and groove joint extends in the direction of insertion of the receiving pocket.

This means that, in a cross-sectional view transverse to the insertion direction, at least one groove projects from the inside of the receiving pocket or a tongue is provided on this inside, in which a tongue projecting from the profile part engages. In the first-mentioned case, the profile part has a groove into which the tongue associated with the heating rib engages. The groove or tongue extends in the insertion direction. When the profile part is inserted, usually together with the PTC heating assembly, the groove is forced into the associated tongue. The tongue and groove slide past each other in the insertion direction and in their longitudinal direction. The groove and/or the tongue can have elastic properties. This results in a certain tolerance compensation. Heat is extracted from the PTC element to the outer surface of the heating rib exposed in the heating chamber via the tongue and groove joint.

A plurality of tongue and groove joints thus may be provided between at least one of the main side surfaces of the PTC element and the opposite inner surface of the receiving pocket. In this context, the main side surface of the PTC element is considered to be the largest extension of the PTC element in a cross-sectional view transverse to the insertion direction. The PTC element is usually cuboid in shape. The main side surface spans the width of the PTC element. In said cross-sectional view, the thickness of the PTC element is perpendicular to the width. Perpendicular to the plane spanned by the width and the thickness and basically in the insertion direction is the longitudinal extension direction of the PTC element or the PTC heating assembly. This longitudinal direction corresponds to the insertion direction of the PTC heating assembly into the receiving pocket.

As previously mentioned, the tongue and groove joint is able to compensate for certain manufacturing tolerances by deformation in the region of the tongue and groove joint. The usually large number of tongue and groove joints between the main side surfaces of the PTC element and the opposite inner surface of the receiving pocket maintains good heat extraction from the PTC element.

Thus, the solution according to an aspect of the invention allows compensation of manufacturing tolerances without affecting the heat extraction from the PTC element.

According to a possible further development of the present invention, a groove limiting projection and/or a tongue projection at least partially forming the tongue can be pivoted about an axis extending essentially in the insertion direction. This pivotability is effected by at least one free-standing groove limiting projection or a free-standing tongue projection. The corresponding projection can be connected to the receiving pocket or the profile part via a relatively thin web. The alignment and shape of the web allow the pivot axis and the pivotability of the projection to be set in a defined manner The pivotability is usually at least elastic, possibly also plastic.

According to a possible further development of the present invention, the profile part has a U-shaped receptacle for the PTC heating assembly. This receptacle usually accommodates the PTC element, the strip conductors and any insulating layers provided, which in particular cover the main side surfaces of the PTC element directly or indirectly.

The profile part can be an extruded profile part. It may be made of aluminum. This makes it necessary to provide at least one insulating layer between the PTC element and an inner surface of the profile part, against which the PTC heating assembly abuts in a heat-conducting manner With respect to the most symmetrical heat extraction and uniform tolerance compensation, a possible aspect of the present invention proposes to provide tongue and groove joints between each main side of the PTC element and the opposite inner side of the receiving pocket. Accordingly, the corresponding tongue and groove joints may be formed adjacent to the two main side surfaces of the PTC element.

With respect to good heat transfer between the profile part and the inside of the receiving pocket, it is proposed in accordance with a further development of the present invention that at least one groove limiting projection limiting the groove and/or at least one tongue projection forming the tongue at least partially is configured to be wedge-shaped tapering towards its free end. The tongue projection and the surface of the groove limiting projection interacting with it are formed in such a way that there is a planar contact between the two. The wedge shape promotes the elastic pivoting movement of one of the projections during joining. In this context, the present invention also assumes that the receiving pocket may taper in a wedge shape toward its lower closed end. In a corresponding manner, the tongue and groove joint can also be wedge-shaped in the insertion direction, so that in each cross-sectional plane transverse to the insertion direction of the PTC heating assembly into the receiving pocket, there is approximately the same coverage in the region of the tongue and groove joint.

At least one groove limiting projection limiting the groove and/or at least one tongue projection at least partially forming the tongue may be integrally formed on the receiving pocket. This specification may also apply to the profile part, which may be formed as an extruded profile and can have a film hinge on the lower side, so that mutually opposite legs of the profile part are connected to one another opposite the connection chamber. This reduces the number of parts to be handled.

According to a possible still development of the present invention, at least one compression element is provided between the profile part and a main side surface of the PTC element. In the case of a U-shaped profile part, the compression element is provided inside the profile part. A compression element may be provided between each of the two main side surfaces of the PTC element and the inner surfaces of the profile part. The compression element may be formed by a tongue formed of a metal. The tongue usually extends over the entire surface of the main side surface in a cross-sectional view transverse to the insertion direction. It may be provided between an inner surface of the profile part and an insulating layer covering the PTC heating assembly on the outside.

According to a possible further development, a curing adhesive may be introduced into the receiving pocket. This is at least partially received in the tongue and groove joint and cured there. Thus, the PTC heating assembly and the profile part are secured in the receiving pocket by the adhesive. The adhesive can be a plastic adhesive with good thermal conductivity. It can, for example, be a silicone adhesive to which good heat-conducting particles, for example aluminum oxide particles, have been added. Thus, the adhesive also improves heat dissipation from the PTC element. It is understood that the entire receiving pocket may be filled with adhesive. The adhesive may be an electrically insulating adhesive.

The present invention proposes with its parallel aspect a method for manufacturing a PTC heating assembly of the kind introductorily mentioned. In this method, the insulating layers applied on the outside against the strip conductors are preliminarily held via the positioning frame. The positioning frame accordingly forms an assembly aid for pre-positioning the insulating layers. These insulating layers are usually inherently rigid and usually contain at least one ceramic layer, which can have further layers on one or both sides, for example in the form of a plastic film. Profile parts are abutted against the outside of the insulating layers so that at least one of the insulating layers is located between each profile part and the strip conductor normally covered by the insulating layer. In the method according to the invention, the profile part is joined to the positioning frame in the manner described above. Thus, the profile part is held to the positioning frame at the end of the assembly of the profile part. The profile part also holds the insulating layer. Thus, the method according to the invention provides a structural unit which can be handled separately during assembly of the electric heating device and comprises the positioning frame, the at least one PTC element, the strip conductors connected thereto in an electrically conductive manner and the insulating layers as well as the profile parts. On both sides of the PTC element there is at least one insulating layer and one profile part.

In this context, the positioning frame can also be connected to the strip conductors in a form-fitting manner, in particular if these are configured in the form of contact sheets.

BRIEF DESCRIPTION OF THE DRAWINGS

Further details of the present invention will be apparent from the following description of an embodiment in conjunction with the drawing. Therein.

DETAILED DESCRIPTION

Figure 1:
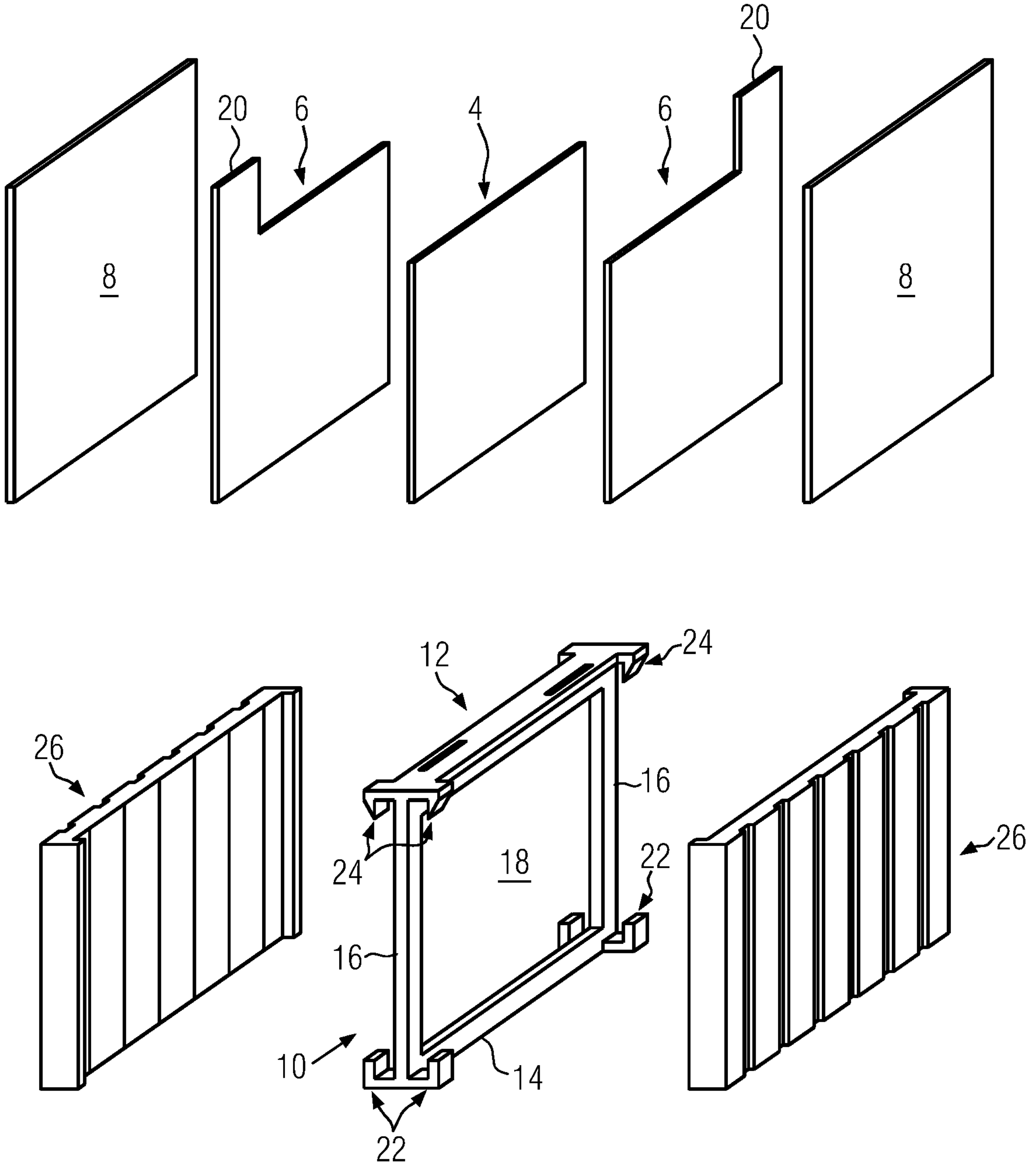
FIG. 1 shows a perspective exploded view of an embodiment of a PTC heating assembly.

FIG. 1 shows a PTC heating assembly 2 with a PTC element 4, on the main side surfaces of which there are strip conductors 6 in the form of sheet metal strips, which are covered on the outer surface opposite the PTC element 4 by insulating layers 8, which in this case consist of ceramic plates. Reference sign 10 characterizes an injection-molded positioning frame made of plastic, which forms a receptacle 18 for the PTC element 4 between two cross beams, of which the upper cross beam is characterized by reference sign 12 and the lower cross beam by reference sign 14, and two longitudinal beams 16 extending at right angles to the cross beams 12, 14. The contact sheets forming the strip conductors 6 have contact tongues 20 integrally formed thereon by punching, which are provided at opposite ends of the positioning frame 10 in the longitudinal direction of the upper cross beam 12 and are received in lead-through openings of the upper cross beam 12.

Form-fit segments 22 with engaging pawls 24 project opposite each other from the cross beams 12 at their outer ends. These special form-fit segments 22 project beyond the upper cross beam 12 in the width direction.

The form-fit segments 22 or the engaging pawls 24 are located at the outer edge of the positioning frame 10 in extension of the longitudinal beams 16 and thus outside the main side surface of the PTC element 4. The main side surface of the PTC element 4 is formed by the respective largest surface of the cuboid PTC element 4. The other surfaces extend between the two main side surfaces as a circumferential edge.

The engaging pawls 24 overlap profile parts characterized by reference sign 26, which are formed by extruded aluminum elements. The profile parts 26 are captively connected to the positioning frame 10 by the form-fit segments 22, 24. As usual, the engaging pawls 24 have a front ramp surface which expands the engaging pawls 24 when the profile parts 26 are pressed on and spring back against the outer surface of the insulating layers 8 after the profile parts 26 have been applied to engage behind the profile parts 26. In this way, the profile parts 26 are connected to the positioning frame 10. The insulating layers 8 are dimensioned such that they also fit between the form-fit segments 22, and if necessary are also latched in the manner described above, but in any case are clamped between the profile parts 26, which are held in a form-fit manner.

Accordingly, during assembly, a contact plate forming the strip conductor 6 is usually connected to the positioning frame 10 on one side, in this case by inserting the contact plate with its contact tongue into the lead-through opening of the upper cross beam 12. The form-fit segments 22 then embrace the strip conductor 6. The receptacle 18 is then closed on one side. The PTC element 4 is then inserted into this receptacle.

Then, for example, on the side provided with the strip conductor 6, the associated insulating layer 8 is applied against the corresponding strip conductor 6. The insulating layer is thereby arranged between the engaging pawls 24 or the form-fit segments 22, which ensure pre-positioning and retention of the insulating layer 8, which according to the embodiment is formed by a ceramic plate. Then, from the same side, the profile part 26 is applied against the positioning frame 10 and connected to the positioning frame 10 via the form-fit segments 22, 24.

On the opposite side, the other strip conductor 6, the insulating layer 8 associated with this strip conductor 6 and finally the profile part 26 provided there may then be mounted in the manner described above. Here too, before the profile part 26 is finally locked to the positioning frame, the positioning frame 10 holds the insulating layer 8 or the strip conductor 6 in a position favorable for assembly.

Figure 2:
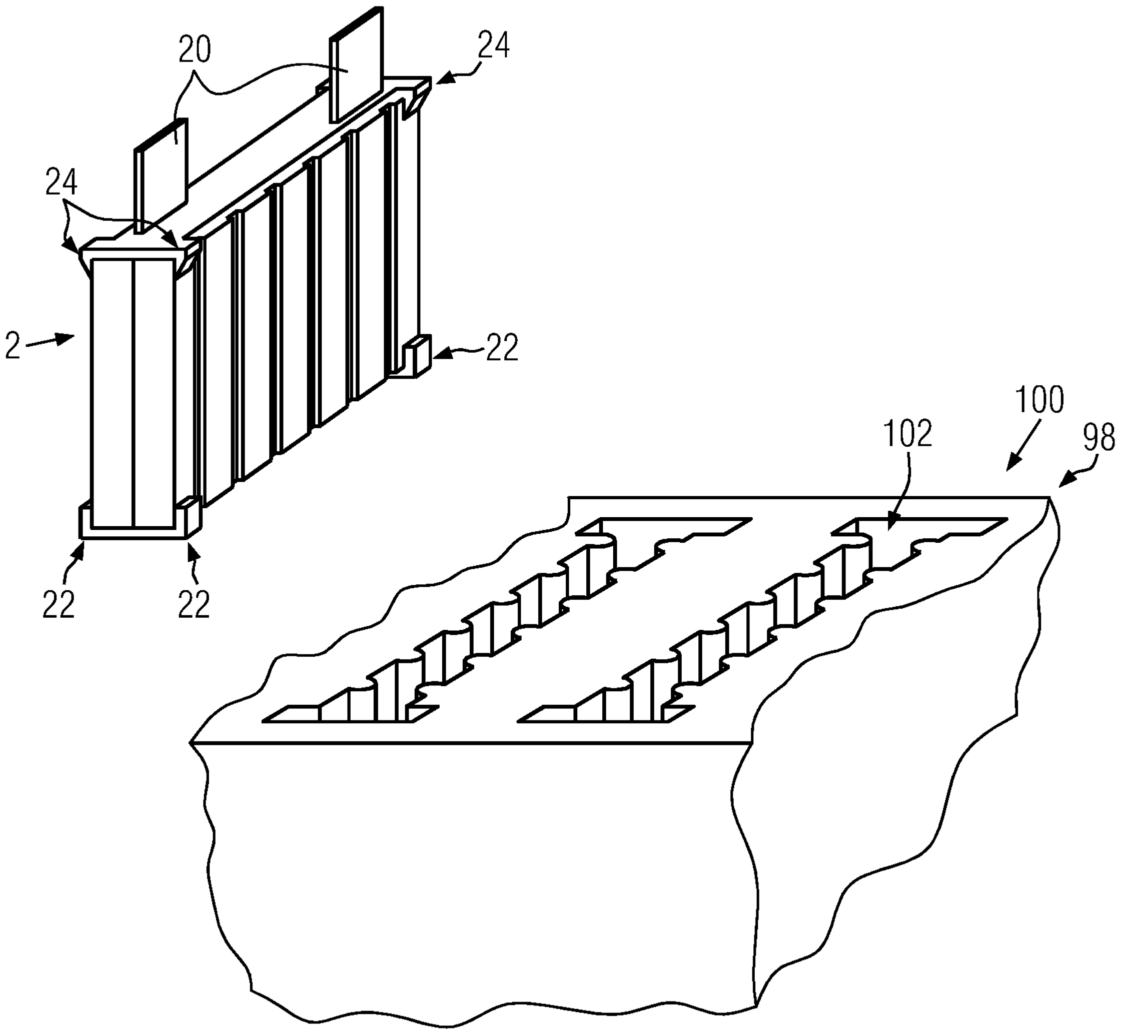
FIG. 2 shows a perspective exploded view of the PTC heating assembly according to FIG. 1 with a housing of an electric heating device shown in sections.

The PTC heating assembly 2 prepared in this way can be seen in FIG. 2 in the assembled state. In this embodiment, it is evident that only the form-fit segments 22 associated with the upper cross beam 12 are designed as engaging pawls. The form-fit segments 22 provided on the lower cross beam 14 merely overlap the profile parts 26.

In FIG. 2, to the right of the PTC heating assembly 2 a housing 100 of an electric heating device characterized by reference sign 98 in the Figures below can be seen. The housing 100 forms receiving pockets 102. One single PTC heating assembly 2 fits in each of the receiving pockets 102. The receiving pockets 102 are each configured like a hammerhead at the end, thus leaving space for the insertion of the form-fit segments 22, 24. In between, a structure of the receiving pocket 102, explained in more detail below, interacts with a structure provided on the outer surface of the profile parts 26 in order, on the one hand, to arrange the PTC heating assembly in the receiving pocket 102 with a certain pretension and thus with good heat-conducting properties, but, on the other hand, to prevent excessive stress on the elements of the PTC heating assembly 2 provided between the profile parts 26. The insulating layers 8 and the PTC element 4 are ceramic components and accordingly are only capable to a limited extent of compensating punctual stresses or bending stresses by elastic deformation.

Figure 3:
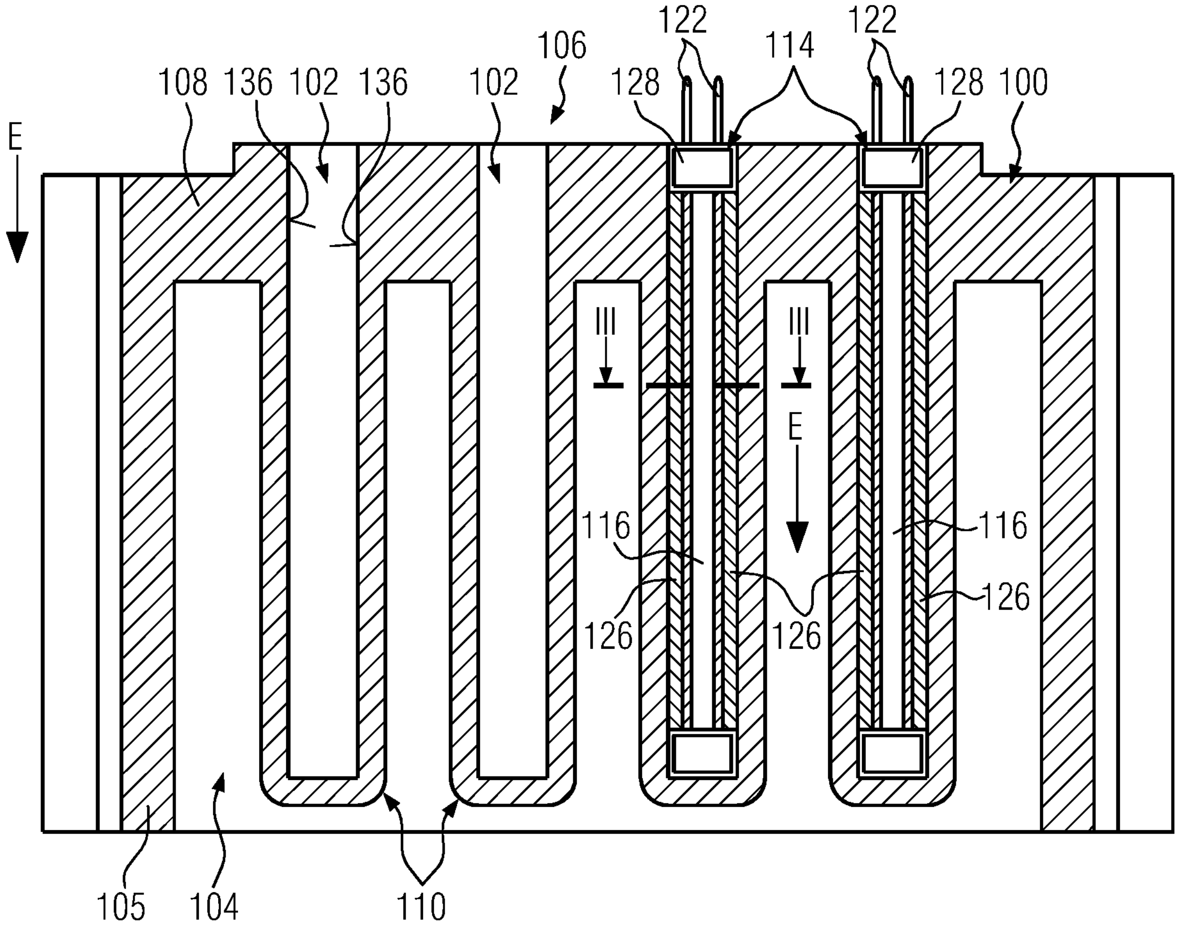
FIG. 3 shows a cross-sectional view of a part of the electric heating device.

FIG. 3 shows the essential components of the electric heating device 98 with a housing 100 made of a material with good thermal conductivity, in this case die-cast aluminum. The housing 100 forms a wall 105 circumferentially surrounding a heating chamber 104. In FIG. 2, the heating chamber 104 is still open at the bottom, since a bottom closing the housing 100 from underneath is not shown in FIG. 3. The same applies to a control housing cover which is connected to the housing 100 on the opposite side in order to cover and surround a connection chamber characterized by reference sign 106. The housing 100 forms a partition wall 108 between the heating chamber 104 and the connection chamber 106. Heating ribs 110 project from this partition wall 108 into the heating chamber 102. The heating ribs 110 are closed at their lower end projecting into the heating chamber 102. As illustrated by the hatching in FIG. 3, the heating ribs 110 together with the partition wall 108 and the wall 105 are formed from a one-piece die-cast aluminum housing 100.

Figure 4:
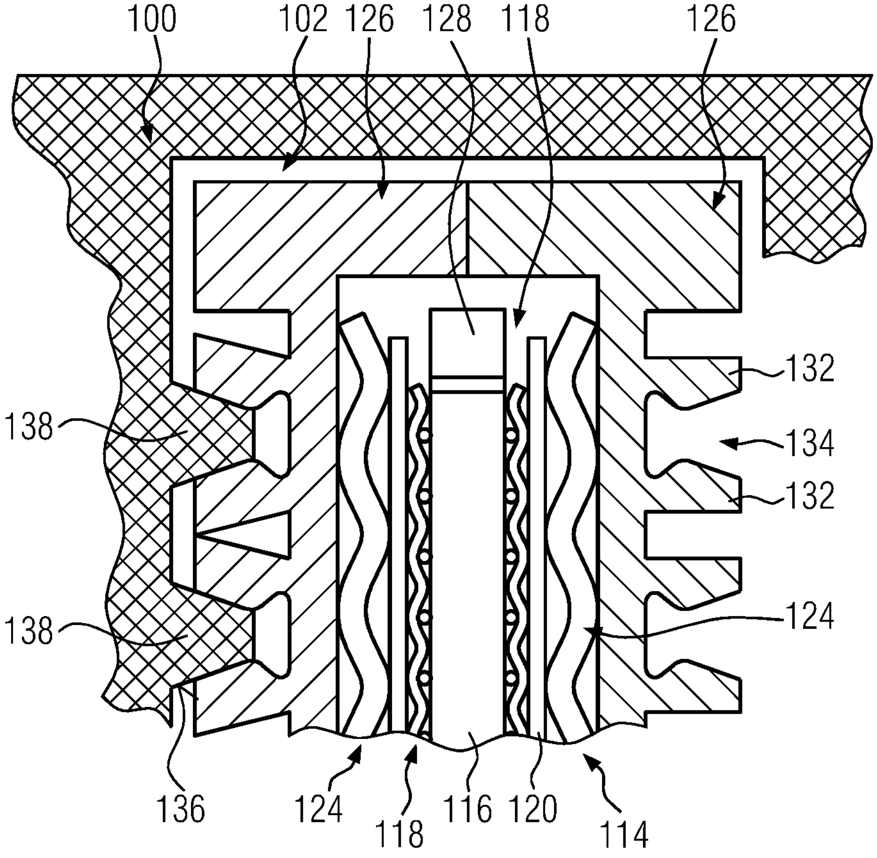
FIG. 4 shows a sectional view along line III-III as shown in FIG. 3.

The heating ribs 110 form a wedge-shaped downwardly tapering receiving pocket 102. The PTC heating assembly characterized by reference sign 2 is received in this receiving pocket 102. As the sectional view according to FIG. 4 illustrates, the PTC heating assembly 114 comprises a PTC element 116 at the main side surfaces of which strip conductors 118 abut, which in the present case comprises a wire mesh made of an electrically conductive material. On the side of the strip conductor 118 opposite the PTC element 116 is an insulating layer 120, which may be formed by a ceramic layer and/or an insulating plastic film. The gap between the insulating layer 120 and the PTC element 116 is filled overall by the strip conductor 118. For this purpose, the spaces between the wire mesh are filled with a good heat-conducting adhesive, which is also provided in the plane of the strip conductor 118 and is to be understood as belonging to the strip conductor 118. The wire mesh surmounts the PTC element to form contact tongues 122, which are shown in FIG. 3. Otherwise, the individual layers of the layered structure between the PTC element 116 and the profile part 126 have been combined in the form of a respective layer shown cut between the respective profile part 126 and the PTC element 116 for the sake of a clear presentation in FIG. 3.

The contact tongues 122 are exposed in the connection chamber 106. The PTC element 116 and the insulating layer 120 are joined into a single unit by adhesive bonding of the strip conductor 118. On the outside of this PTC heating assembly 114 compression elements 124 in the form of corrugated spring plates are provided, which can be seen in FIG. 4.

FIG. 4 shows details of the respective profile parts 126, which are configured identically in the present case. The compression elements 124 abut against the inner sides of these profile parts 126.

Groove limiting projections 132 project from the outsides of the profile parts 126 and enclose a groove 134 between them in pairs. As illustrated in particular by FIG. 4, a plurality of identically configured grooves 134 are recessed in this form on the outside of the main side surfaces of the profile parts 126. The grooves 134 extend in the insertion direction of the receiving pocket 102, which is characterized by E in FIG. 3.

An inner surface 136 of the receiving pocket 102 includes projecting tongue projections 138. These tongue projections 138 are integrally formed on the die-cast housing 100. As conveyed by the cross-sectional view shown in FIG. 4, the tongue projections 138 taper toward their free end in a wedge shape. In a corresponding manner, the groove limiting projections 132 are also configured to taper in a wedge shape toward their free front end. It is understood that only the surfaces of the groove limiting projections 132 respectively limiting the groove 134 have such a configuration. In order to illustrate this, the tongue projections 138 are omitted on the right side in FIG. 4.

In the embodiment shown in FIG. 4, the positioning frame 128 is first equipped with the PTC element 116, the strip conductors 118 and the insulating layers 120 as well as the compression elements 124 and the profile parts 126 during assembly. Then the PTC heating assembly 114 pre-assembled in this way is inserted into the receiving pocket 102. In the process, the tongue projections 138 engage in the grooves 134 associated with them. The result is a deformation in the region of the groove limiting projections 132, which can be seen from the comparison of the right-hand side with the left-hand side according to FIG. 4. This results in a certain tolerance compensation. In addition, the compression element 124 is deformed for tolerance compensation. Ideally, after assembly, the compression element 124 abuts essentially over its entire surface against the inner surface of the profile part 26 on the one hand and against the outside of the insulating layer 120 on the other.

The compression element 124 may be made of aluminum, copper, copper beryllium, or other material that has good thermal conductivity and applies permanently elastic pre-tensioning forces.

Any remaining cavities in the receiving pocket 102 can be filled by a good heat-conducting compound, such as a curing plastic compound filled with heat-conducting particles.

Figure 5:
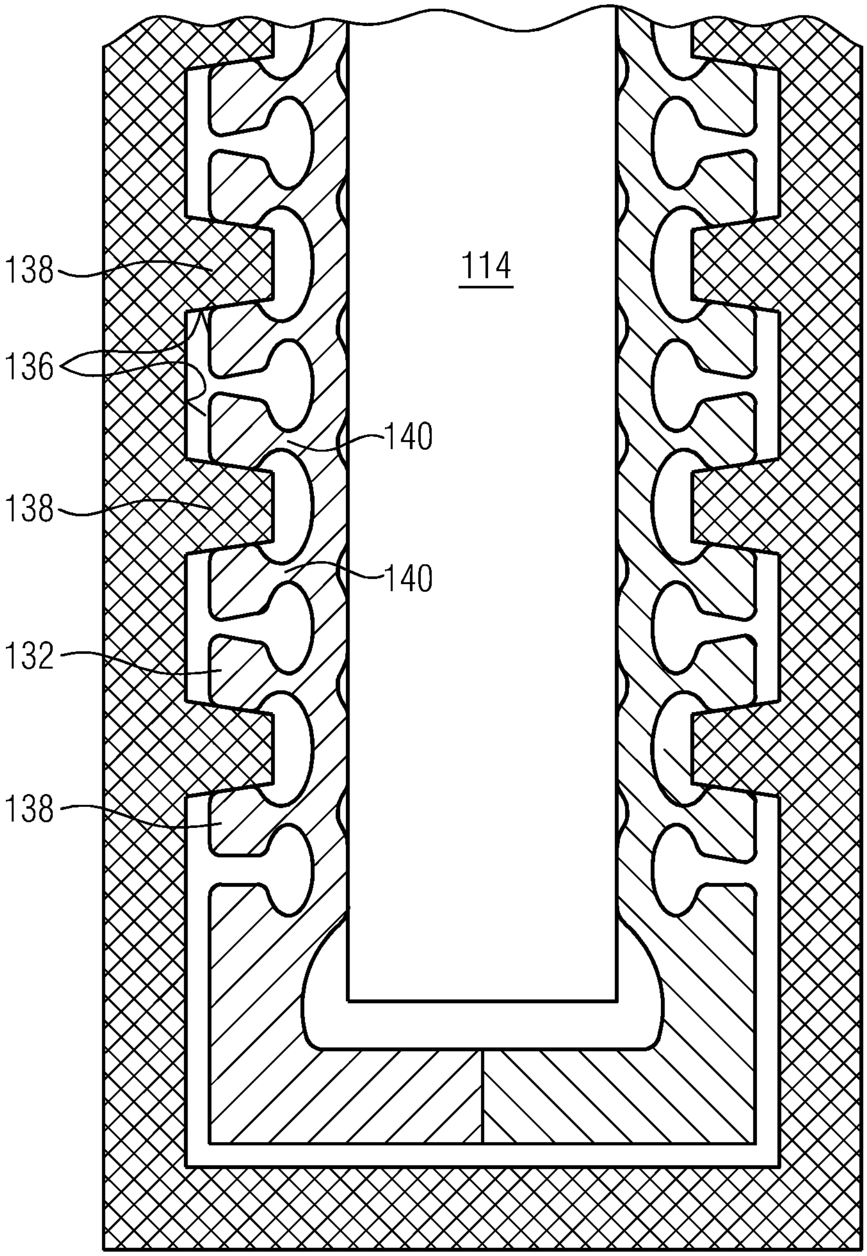
FIG. 5 shows a sectional view according to FIG. 4 for one variant.

In the variant shown in FIG. 5, the groove limiting projections 132 are connected to the remaining profile part 26 via a relatively thin web 140. This web 140 provides a pivot axis that extends substantially in the insertion direction E. In this embodiment, compression elements may be omitted. Groove limiting projections 132 adjacent to different grooves 134 are spaced sufficiently far apart so that they can each pivot about their pivot axis when the wedge-shaped tongue projections 138 are inserted, without bumping against each other. This allows for considerable tolerance compensation. The layers of the PTC heating assembly 2 inside the profile parts 126 are thereby applied with good elastic tension against the inner surface of the two profile parts 126, which improves heat extraction.

FIG. 5 also illustrates the curvature of the inner surface of the profile parts 126 in such a way that, in a cross-sectional view, the profile part is essentially applied to the insulating layer 120 punctually and in a linear manner in the longitudinal direction. This deformation of the respective profile part 126 also causes additional elastic tensioning of the layers of the PTC heating assembly 114 in the receiving pocket 102.

The invention claimed is:

1. An electric heating device comprising:

a housing forming a receiving pocket;

a positioning frame that is disposed in the receiving pocket, the positioning frame having an upper cross beam and a lower cross beam opposite the upper cross beam;

a PTC element and strip conductors that are received in the positioning frame, the strip conductors being electrically conductively connected to the PTC element for energizing the PTC element with different polarity, wherein at least one profile part is connected in a heat-conducting manner to the PTC element on each of two opposite main side surfaces of the PTC element, wherein outer main side surfaces of the profile parts opposite the PTC element are connected in a heat-conducting manner to an inner surface of the receiving pocket in each case, and wherein the profile parts are connected to the positioning frame by form fit segments extending from the upper cross beam and form fit segments extending from the lower cross beam.

2. The electric heating device according to claim 1, wherein the profile parts are clipped to the positioning frame.

3. The electric heating device according to claim 1, wherein the upper cross beam of the positioning frame is surmounted on one side thereof by contact tongues.

4. The electric heating device according to claim 1, wherein the form fit segments extending from at least one of the cross beams is an engaging pawl.

5. The electric heating device according to claim 1, wherein the profile parts are each formed by extruded profiles made of metal.

6. The electric heating device according to claim 5, wherein the metal is aluminum.

7. The electric heating device according to claim 1, wherein an electrically insulating layer is provided between each of the profile parts and the strip conductors.

8. The electric heating device according to claim 1, wherein the profile parts are connected to the receiving pocket via a tongue and groove joint extending in an insertion direction (E) of the receiving pocket.

9. The electric heating device according to claim 8, wherein the tongue and groove joint has at least one groove limiting projection limiting the groove and at least one tongue projection at least partially forming the tongue, which tongue is received within the groove for forming the tongue and groove joint, and wherein at least one of the groove limiting projection and the tongue projection can be pivoted about an axis extending in the insertion direction (E) of the receiving pocket.

10. The electric heating device according to claim 1, wherein the housing comprises a partition wall which separates a connection chamber from a heating chamber for dispensing heat and from which at least one heating rib protrudes towards the heating chamber and forms the receiving pocket.

11. A method for producing a PTC heating assembly for an electric heating device, the electric heating device including a housing which forms a receiving pocket in which the PTC heating assembly is received, the PTC heating assembly including at least one PTC element which is received in a positioning frame and strip conductors which are electrically conductively connected to the PTC element for energizing the PTC element with different polarity and which are each covered on an outside surface thereof with at least one insulating layer, the method comprising:

applying insulating layers on the outside against the strip conductors such that the insulating layers are held via the positioning frame; and applying profile parts against the insulating layers with the profile parts being held on an outside of the respective insulating layer facing away from the PTC element and captively connecting the profile parts to the positioning frame via form fit segments extending from an upper cross beam of the positioning frame and form fit segments extending from a lower cross beam of the positioning frame so as to form a structural unit comprising the position frame, the PTC element, the strip conductors, the insulating layers, and the profile parts.

12. The method according to claim 11, further comprising inserting the formed structural unit into the receiving pocket.

* * * * *